US012662099B2

(12) United States Patent
Ramirez Hernandez et al.

(10) Patent No.: US 12,662,099 B2
(45) Date of Patent: Jun. 23, 2026

(54) METHOD FOR ADJUSTING THE CLAMPING FORCE EXERTED BY AN ELECTROMECHANICAL BRAKE

(71) Applicant: HITACHI ASTEMO FRANCE, Drancy (FR)

(72) Inventors: Carlos Eduardo Ramirez Hernandez, Issy les Moulineaux (FR); Abdessamed Ramdane, Beauvais (FR)

(73) Assignee: HITACHI ASTEMO France, Drancy (FR)

( * ) Notice: Subject to any disclaimer, the term of this patent is extended or adjusted under 35 U.S.C. 154(b) by 189 days.

(21) Appl. No.: 18/573,509

(22) PCT Filed: Jun. 23, 2022

(86) PCT No.: PCT/EP2022/067182
§ 371 (c)(1),
(2) Date: Dec. 22, 2023

(87) PCT Pub. No.: WO2022/268958
PCT Pub. Date: Dec. 29, 2022

(65) Prior Publication Data
US 2024/0294159 A1 Sep. 5, 2024

(30) Foreign Application Priority Data
Jun. 23, 2021 (FR) ...................................... 2106673

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01)

(58) Field of Classification Search
CPC ........ B60T 13/741; B60T 17/221; B60T 8/00; B60T 8/327; B60T 17/22; B60T 8/32; F16D 2066/005; H02P 6/18; H02P 23/14
See application file for complete search history.

(56) References Cited

U.S. PATENT DOCUMENTS 9,694,799 B2 * 7/2017 Baehrle-Miller ..... B60T 13/746
10,471,946 B2 * 11/2019 Baehrle-Miller ..... B60T 13/741
(Continued)

FOREIGN PATENT DOCUMENTS

DE 102014203350 A1 8/2015
WO 2019054376 A1 3/2019
WO 2019131659 A1 7/2019

OTHER PUBLICATIONS

International Search Report and Written Opinion in PCT/EP2022/067182 dated Sep. 6, 2022.
(Continued)

*Primary Examiner* — Kurt Philip Liethen
(74) *Attorney, Agent, or Firm* — Dilworth IP, LLC

(57) ABSTRACT

A method for adjusting the clamping force exerted by an electromechanical brake of a motor vehicle, the brake including an electric motor provided with a rotating shaft which is intended to drive a mechanical brake-application mechanism, the electric motor being controlled by a PWM-type voltage controller, in which the rotational speed of the motor is estimated from an estimate of the motor resistance and an estimate of the motor constant, and then the clamping force is determined from the estimate of the rotational speed of the motor, wherein the estimate of the motor resistance is updated during an inactive phase with no voltage control.

18 Claims, 3 Drawing Sheets

(56) References Cited

U.S. PATENT DOCUMENTS

| | | | |
|---|---|---|---|
| 11,498,540 B2 * | 11/2022 | Pasquet | B60T 13/746 |
| 2011/0224880 A1 * | 9/2011 | Baehrle-Miller | B60T 7/085 |
| | | | 701/70 |
| 2012/0205202 A1 * | 8/2012 | Baehrle-Miller | B60T 13/588 |
| | | | 188/106 P |
| 2015/0239439 A1 | 8/2015 | Sussek | |
| 2016/0356330 A1 * | 12/2016 | Baehrle-Miller | B60T 13/741 |
| 2021/0309108 A1 * | 10/2021 | Sanchez | B60T 7/042 |

OTHER PUBLICATIONS

"Control Tutorials for MATLAB and Simulink—Motor Speed_ System Modeling", CTMS, online available at <https://ctms.engin. umich.edu/CTMS/index.php?examlpe=Motorspeed&selection= SystemModeling#3, retrieved on Jan. 24, 206, pp. 3-6.
"DC Motors and Generators", Chapter 2, in DC Motors Speed Controls Servo Systems, an Engineering Handbook, Fifth edition, Electro-Craft Corporation, 1980, pp. 2-1-2-114.
"Dynamics and Control of Electrical Drives", by Piotr Wach, Springer Berlin, 2011, 468 pages.
"Conventional D.C. Motors", Chapter 3 in Electric Motors and Drives Fundamentals, Types and Applications, Third Edition by Austin Hughes, 2006, pp. 82-132.

* cited by examiner

METHOD FOR ADJUSTING THE CLAMPING FORCE EXERTED BY AN ELECTROMECHANICAL BRAKE

FIELD OF THE INVENTION

The invention relates to the field of motor vehicle braking actuators, more particularly a method for adjusting the clamping force exerted by an electromechanical brake.

BACKGROUND

A motor vehicle braking system generally comprises mechanical brake-clamping means comprising in particular friction means, such as brake pads, connected to an actuator adapted to move these friction means towards the wheel of the vehicle to clamp it and thus brake the vehicle by friction, or move them apart to stop braking. In the case of an electromechanical brake, the mechanical clamping means are controlled by an electric motor provided with a rotating shaft driving them.

To modify the rotational speed of a motor @ (rad/s), the electromotive force E must be varied. This force is proportional to the voltage:

$$E = K.\omega = U - R.i$$

Where:
- K: the motor constant
- U: the voltage
- i: the current
- R the motor resistance It is known, for example, from documents WO2019131659 and DE102014203350 to modify the rotational speed of a motor ω (rad/s) using a PWM (Pulse Width Modulation) type voltage control.

This consists in supplying the motor with rectangular voltage pulses. The average voltage therefore depends on the cyclic ratio T0/T. The speed ω varies according to this average voltage.

Thus, in order to control an electric motor, the PWM control, therefore a voltage control, the motor constant K, and the motor resistance R must be determined. The estimate of the speed ω is also important to estimate the angle of rotation of the DC motor, since this type of motor does not have an angle sensor.

Currently, the motor resistance is calculated during the inrush current peak in a direct current (DC) motor.

However, the value of the motor resistance changes according to the temperature, and the temperature changes when braking. With the current methods therefore, there is a risk of overestimating or underestimating the value of the resistance, and therefore, either not braking sufficiently, or increasing the friction and therefore limiting the service life of the brakes.

The invention therefore aims to provide a method for adjusting the clamping force exerted by an electromechanical brake of a motor vehicle, which avoids the above-mentioned problems.

SUMMARY

The invention therefore relates to a method for adjusting the clamping force exerted by an electromechanical brake of a motor vehicle, the brake comprising an electric motor provided with a rotating shaft which is intended to drive mechanical brake-application means, the electric motor being controlled by means of a PWM-type voltage control, in which the rotational speed of the motor (@) is estimated from an estimate of the motor resistance (R*) and an estimate of the motor constant (K*), and then the clamping force is determined from the estimate of the rotational speed of the motor (@), in which the estimate of the motor resistance is updated during an idle phase (of the motor controller (ECU)) with no voltage control (corresponding to a phase when the pads are approaching the disc).

By calculating the motor resistance during the idle phase of the motor controller, and by constantly updating this estimate, a more precise estimate of the motor resistance can be obtained. In addition, such a solution can be implemented with or without a specific sensor.

Lastly, such a method can be used to detect anomalies on the first estimate of the resistance, even as an angle sensor.

The method may further comprise one or more of the following characteristics, taken alone or in combination:
- the estimate of the motor resistance is updated using a polynomial function of order n, n being greater than or equal to 2, centred around the nominal value of the motor resistance expressed as an integer; using only one second-degree polynomial function, the estimate of the motor resistance can be carried out at low calculation cost, and therefore, this equation that is quick and easy to implement can be used to observe the change in the motor resistance, and consequently the change in temperature, over shorter periods of time (less than 1 ms);
- the estimate of the motor resistance is updated according to a sampling interval less than 1 ms;
- the brake comprising an electric motor provided with a rotating shaft which is intended to drive mechanical brake application mean, the clamping force is determined according to the updated motor resistance (R[n]), and an actuator controls the mechanical brake application means to apply the clamping force thus estimated;
- the motor resistance (R[n]) is estimated at a given time from a previous value of the motor resistance (R[n−1]), and using a relation describing the resistance of a solenoid in which the voltage (Vbat) is replaced by the difference (V'bat) between the voltage (Vbat) and the motor voltage (U);
- in the relation describing the resistance of a solenoid, the exponential function is replaced by a Taylor series of order n, n being greater than or equal to 2, centred around the nominal value of the motor resistance expressed as an integer;
- the motor resistance (R[n]) is estimated at a given time using the following relation:

$$R[n] = \frac{V'_{bat}\delta}{i[n]} + \left( \frac{i[n-1]R[n-1]}{i[n]} - \frac{V'_{bat}\delta}{i[n]} \right)(a.R[n-1]^2 + b.R[n-1] - c)$$

where:
- R[n]: motor resistance at interval n
- R[n−1]: motor resistance at interval n−1
- i[n]: motor current at interval n
- i[n−1]: motor current at interval n−1
- $V'_{bat}\delta = V_{bat}\delta - K^*w$: where Vbat is the motor supply voltage, K is the motor constant, and @ is the rotational speed of the motor.

a: polynomial coefficient
b: polynomial coefficient
c: polynomial coefficient
the polynomial coefficients have the following values:
    a=0.4523
    b=0.291
    c=0.07027
the polynomial coefficients a, b and c are integers;
the polynomial coefficients have the following values:
    a=3
    b=2037
    c=490979
the parameters of the relation for determining the motor
    resistance are expressed in uint32, after expressing the
    motor resistance in mΩ, the voltage value is expressed
    with a gain of 100000 and the current is expressed with
    a gain of 100;
a gain of 7000000 is added;
the motor voltage is determined by multiplying the motor
    constant by the rotational speed of the motor;
the rotational speed of the motor is estimated or measured
    using an onboard sensor.

The invention also relates to a braking system adapted to implement the method according to the invention.

According to the invention, the braking system can comprise a braking electric motor, and a controller adapted to implement the method according to the invention. According to one example, the nominal resistance of the motor is 0.34Ω and the inductance of the motor is 0.000117 H, and the controller has a sampling time (t) of 100 ms.

The controller can be a 16-bit or 32-bit controller.

The invention also relates to a vehicle comprising the braking system according to the invention.

BRIEF DESCRIPTION OF THE FIGURES

The invention will be better understood on reading the following description, given solely by way of example and with reference to the accompanying drawings in which.

DETAILED DESCRIPTION

Figure 3:
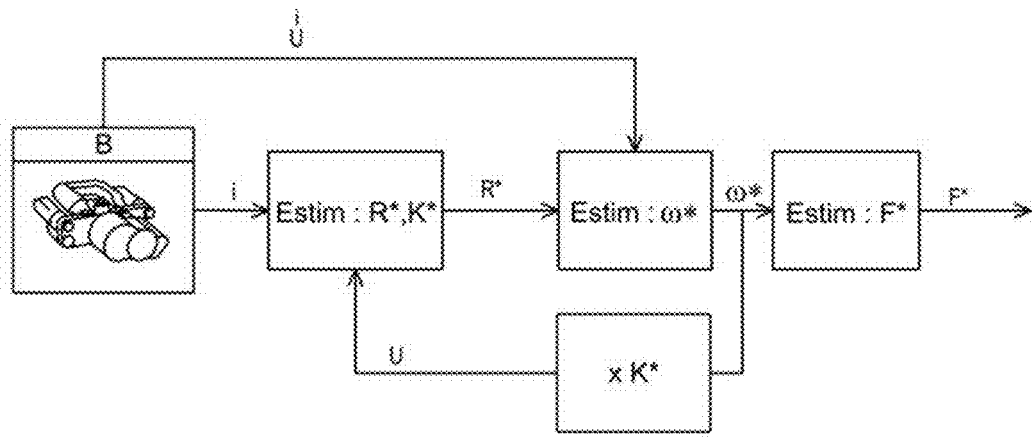
FIG. 3 is a diagram of a flowchart showing the operation of the method for adjusting the clamping force exerted by an electromechanical brake of a motor vehicle, according to a particular embodiment of the invention.
Figure 4:
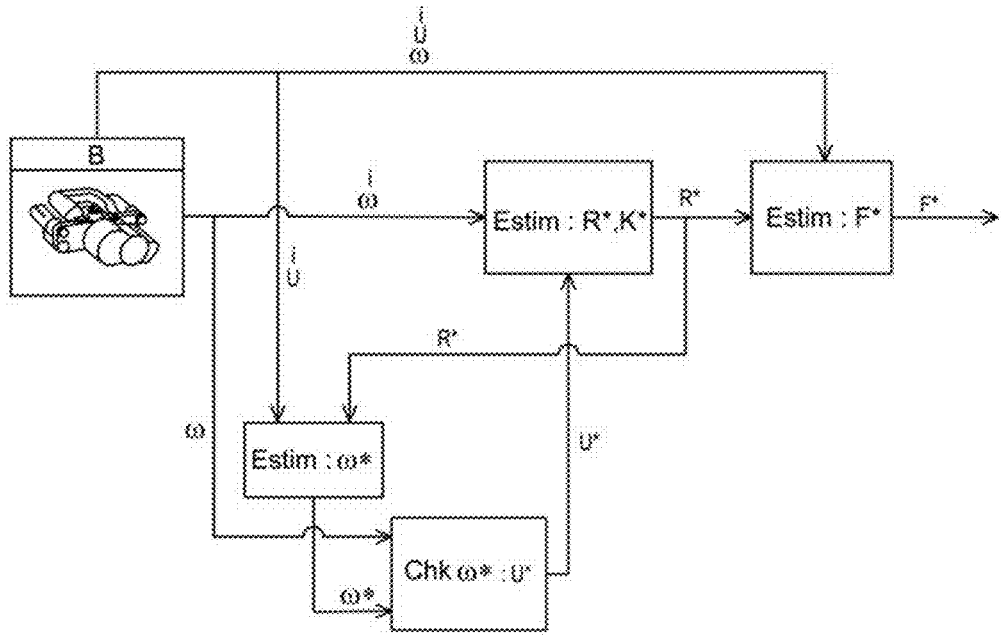
FIG. 4 is a diagram of a flowchart showing the operation of the method for adjusting the clamping force exerted by an electromechanical brake of a motor vehicle, according to a second particular embodiment of the invention.

FIGS. 3 and 4 are diagrams of a flowchart showing the operation of the method for adjusting the clamping force (F*) exerted by an electromechanical brake (B) of a motor vehicle, according to two particular embodiments of the invention.

Figure 5:
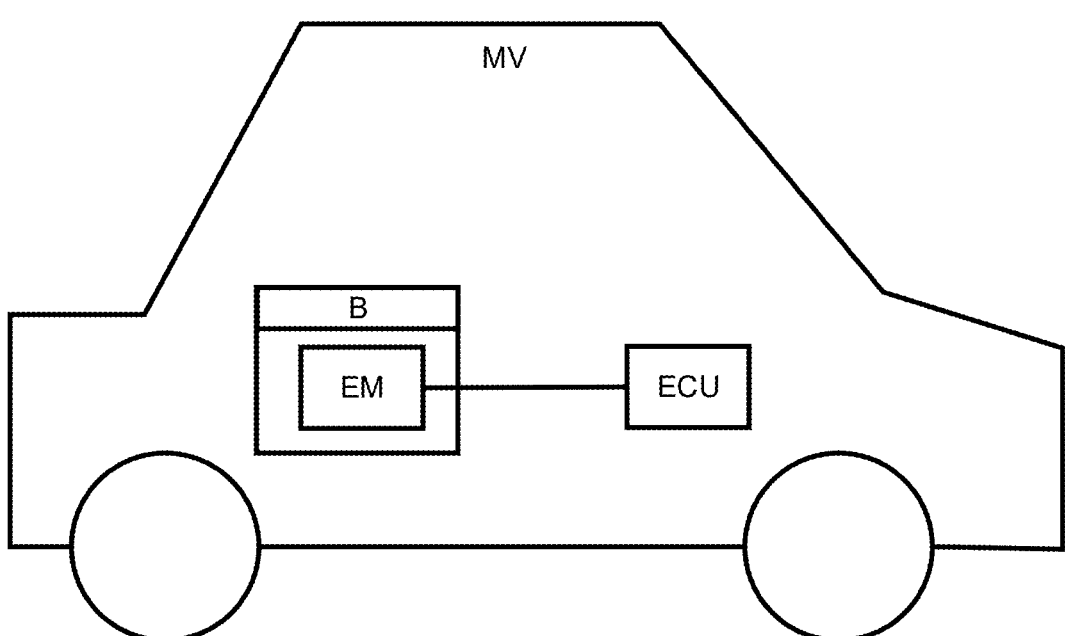
FIG. 5 is a diagram schematically illustrating the motor vehicle with the electromechanical brake for implementing the method.

FIG. 5 is a diagram schematically illustrating the motor vehicle (MV) with the electromechanical brake (B) for implementing the method. Conventionally, the electromechanical brake (B) comprises an electric motor (EM) provided with a rotating shaft which is intended to drive mechanical brake application means (not shown). The electric motor (EM) is preferably a direct current (DC) electric motor. Since it is an electromechanical brake of known type, it will not be described in detail here.

The electric motor is controlled with a motor controller (ECU) using a PWM (Pulse Width Modulation) type voltage control.

According to the invention, the method comprises the following steps:
    estimating the motor resistance R*;
    estimating the motor constant K*;
    estimating the rotational speed of the motor ω* from
        estimates of resistance R* and motor constant K*; then
    determining the clamping force F* from the estimate of
        the rotational speed of the motor ω*.
On FIGS. 3 and 4:
    the first two steps are written: "Estim: R*, K*";
    the third step is written: "Estim: ω*";
    the fourth step is written: "Estim: F*".

The clamping force F* is determined continuously, and to obtain a precise and reliable value of this clamping force, the estimate of the motor resistance is updated continuously.

To do this, the estimate of the motor resistance is updated during an idle phase of the motor controller (ECU), in other words, during the phase with no voltage control (OFF phase of the PWM-type voltage control).

The "Idle" phase corresponds to the phase when the pads are approaching the disc. On the example of FIG. 1, this phase is shown on the left. Thus, the maximum voltage available is reached with no voltage control. This last characteristic improves the estimate of the motor resistance R* and of the motor constant K*.

To do this, and advantageously, the estimate of the motor resistance is updated using a polynomial function of order n, n being greater than or equal to 2, centred around the nominal value of the motor resistance expressed as an integer.

Thus, the time required to calculate the update is very fast, and therefore allows the estimate of the motor resistance to be updated during the idle phase of the motor controller (ECU) even when this idle phase is of the order of one millisecond.

"Continuously" means a calculation and an update according to a sampling interval less than 1 ms.

Thus, the clamping force F* is determined continuously from the value of the updated motor resistance (R[n]). Then, an actuator controls the mechanical brake application means to apply the clamping force so determined.

According to one embodiment, the motor resistance (R[n]) is estimated at a given time from a previous value of the motor resistance (R[n−1]), and using a relation describing the resistance of a solenoid in which the voltage (Vbat) is replaced by the difference (V'bat) between the voltage (Vbat) and the motor voltage (U). Thus, the function used to update the motor resistance is written:

$$R[n] = \frac{V'_{bat}\delta}{i[n]} + \left(\frac{i[n-1]R[n-1]}{i[n]} - \frac{V'_{bat}\delta}{i[n]}\right)e^{-\frac{t}{\frac{L}{R[n-1]}}}$$

To obtain a polynomial function of order n, the exponential function of the relation describing the resistance of a solenoid is replaced, according to a preferred embodiment, by a Taylor series of order n, n being greater than or equal to 2, centred around the nominal value of the motor resistance expressed as an integer. Thus, the function used to update the motor resistance is written:

$$R[n] = \frac{V'_{bat}\delta}{i[n]} + \left(\frac{i[n-1]R[n-1]}{i[n]} - \frac{V'_{bat}\delta}{i[n]}\right)(a.R[n-1]^2 + b.R[n-1] - c)$$

where:

R[n]: motor resistance at interval n
R[n−1]: motor resistance at interval n−1
i[n]: motor current at interval n
i[n−1]: motor current at interval n−1.
$V'_{bat}\delta=V_{bat}\delta-K^*w$: where Vbat is the motor supply voltage, K is the motor constant, and wis the rotational speed of the motor.
t: sampling interval
L: motor inductance
a: polynomial coefficient
b: polynomial coefficient
c: polynomial coefficient Thus, to further reduce the time to calculate the update, the parameters of the relation for determining the motor resistance are expressed as an integer of "uint32" type, and not as a real number of "floating" type. Thus, preferably, a, b and c are integers. To do this, the motor resistance is expressed in mΩ, and a gain of 100000 is applied to the voltage value, a factor of 100 is applied to the current and a factor of 1000 is applied to the time interval.

Thus, for a motor having a nominal resistance of 0.34Ω and an inductance of 0.000117 H, and for a controller having a sampling interval (t) of 100 µs, the exponential function of the relation describing the resistance of a solenoid is centred around 340 mΩ instead of 0.34Ω.

The exponential function is thus written:

$$e^{-\frac{t*1000}{\frac{L}{R[n-1]}}} = 5.5868e^{-6}R^2 + 2.91e^{-4}R - 0.07014$$

According to a preferred embodiment, a gain of 7000000 is added, to obtain integer polynomial coefficients:

a=3
b=2037
c=490979

Figure 1:
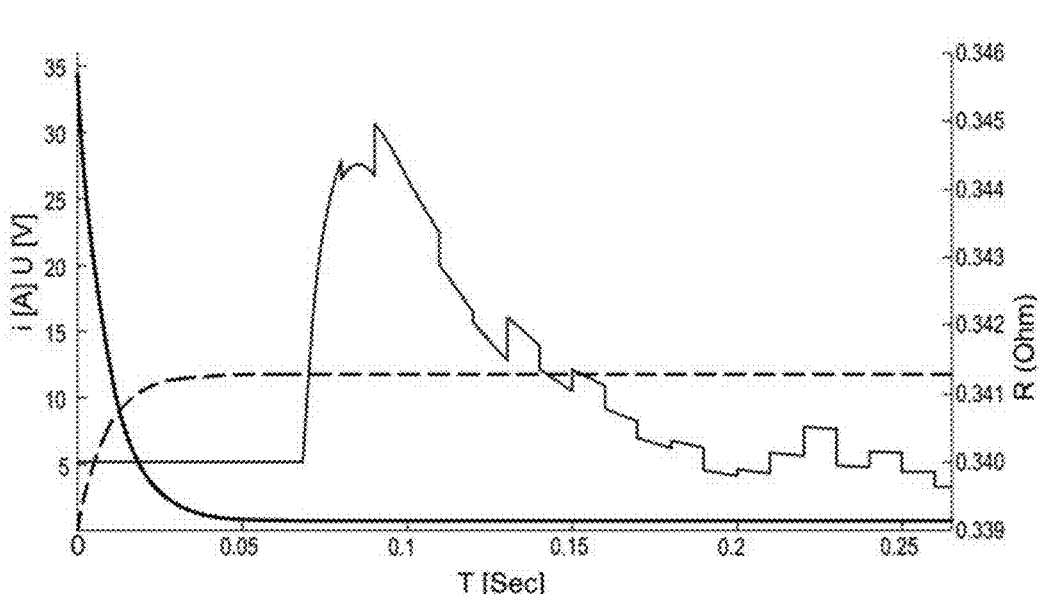
FIG. 1 is an example of result illustrating the estimate of the motor resistance, the motor voltage and the motor current against time.

FIG. 1 is an example of result illustrating the estimate of the motor resistance R*, the motor voltage U and the motor current i against time T.

On FIG. 1, the x-axis represents the time (T) in seconds, and the y-axis represents on the right the motor current (i) in amps and the voltage (U) in volts, and on the left the estimated motor resistance (R*) in ohms. The thick continuous curve corresponds to the change of motor current i. The dotted curve corresponds to the change of motor voltage U. The thin continuous curve corresponds to the change of estimated resistance R*.

Figure 2:
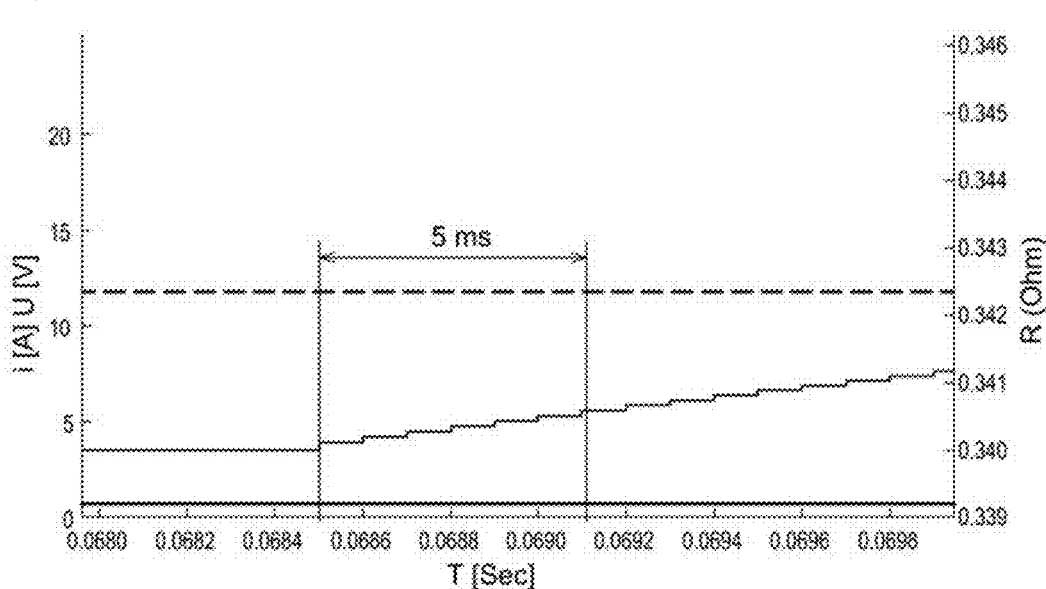
FIG. 2 is an enlargement of FIG. 1 around 0.0688 s.

We observe a precise and continuous estimate of the resistance, from the phase with no voltage control (idle phase of the motor controller (ECU)). The change of estimate during this phase is more visible on FIG. 2, which is an enlargement of FIG. 1 around 0.0688 s.

We will now describe a first embodiment with reference to FIG. 3. According to this embodiment, no sensor is required to estimate the clamping force F*. The two known parameters are in fact the voltage U and the current i of the motor. Then, the motor resistance (R*) is estimated from the motor current i and the motor voltage U (which can be estimated (U*) from the estimated motor constant K*). The motor speed ω is then estimated (ω*) from the estimated motor resistance R*, the voltage U and the current i of the motor. Lastly, the clamping force F* is estimated from this speed ω*. The motor voltage (U) can be determined by multiplying the estimated motor constant (K*) by the estimated rotational speed of the motor (ω*).

We will now describe a second embodiment with reference to FIG. 4. According to this embodiment, an onboard speed sensor is used. Thus, the known parameters are the rotational speed ω, the voltage U and the current i of the motor. According to this embodiment, the clamping force F* is estimated from the estimate of the motor resistance R*, and from the three known parameters (the rotational speed @, the voltage U and the current i of the motor). The resistance R* is estimated from two known parameters, the current i and the speed @ of the motor, and one estimated parameter, the motor voltage (U*). The latter is estimated during a step of checking the estimate of the rotational speed ω* from U (see the lower block on FIG. 4, referenced: "Chk ω*: U*").

The invention also relates to a braking system adapted to implement the method according to the invention.

The system comprises a braking electric motor, and a controller adapted to implement the method according to the invention.

According to one embodiment, the nominal resistance of the motor is 0.34Ω and the inductance of the motor is 0.000117 H, and the controller has a sampling time (t) of 100 ms.

According to one embodiment, the braking system comprises a 16-bit or 32-bit controller.

The invention also relates to a vehicle comprising the braking system according to the invention.

LIST OF REFERENCES

MV: Motor Vehicle
B: Brake
EM: Electric Motor
ECU: Motor Controller
T: time
i: motor current
U: motor voltage
U*: estimated motor voltage
R*: estimated motor resistance
K*: motor constant
ω: rotational speed of the motor
ω*: estimated rotational speed of the motor
F*: estimated clamping force
References related to the estimate formula:
R[n]: motor resistance at interval n
R[n−1]: motor resistance at interval n−1
i[n]: motor current at interval n
i[n−1]: motor current at interval n−1.
$V'_{bat}\delta=V_{bat}\delta-K+w$: where Vbat is the motor supply voltage, K is the motor constant, and wis the rotational speed of the motor.
t: sampling interval
L: motor inductance
a: polynomial coefficient
b: polynomial coefficient
c: polynomial coefficient
The invention claimed is:

1. A method for adjusting a clamping force exerted by an electromechanical brake of a motor vehicle, the electromechanical brake comprising an electric motor provided with a rotating shaft which is intended to drive mechanical brake-application means, the electric motor being controlled by a PWM-type voltage control, comprising steps of:

estimating a motor resistance, estimating a motor constant, estimating a rotational speed of the electric motor from the estimate of the motor resistance and the estimate of the motor constant, determining the clamping force from the estimate of the rotational speed of the electric motor, adjusting the clamping force by applying the determined clamping force with the electromechanical brake, wherein the estimate of the motor resistance is updated during an idle phase of the motor controller with no voltage control.

2. The method according to claim 1, in which the estimate of the motor resistance is updated using a polynomial function of order n, n being greater than or equal to 2, centered around a nominal value of the motor resistance expressed as an integer.

3. The method according to claim 1, in which the estimate of the motor resistance is updated according to a sampling interval less than 1 ms.

4. The method according to claim 1, wherein the clamping force is determined according to the estimate of the motor resistance that is updated during the idle phase, and an actuator controls the mechanical brake application means to apply the clamping force.

5. The method according to claim 1, wherein the estimate of the motor resistance is updated continuously, wherein the motor resistance is estimated at a given time from a previous estimate of the motor resistance using a relation describing the resistance of a solenoid in which a motor supply voltage is replaced by a difference between the motor supply voltage and a motor voltage.

6. The method according to claim 5, in which a relation is used describing the resistance of a solenoid in which an exponential function is replaced by a Taylor series of order n, n being greater than or equal to 2, centered around a nominal value of the motor resistance expressed as an integer.

7. The method according to claim 6, in which the estimate of the motor resistance is updated at the given time using the following relation:

$$R[n] = \frac{V'_{bat}\delta}{i[n]} + \left(\frac{i[n-1]R[n-1]}{i[n]} - \frac{V'_{bat}\delta}{i[n]}\right)\left(a.R[n-1]^2 + b.R[n-1] - c\right)$$

8 where:

R[n]: motor resistance at interval n,

R[n−1]: motor resistance at interval n−1, i[n]: motor current at interval n, i[n−1]: motor current at interval n−1, $V'_{bat}\delta = V_{bat}\delta - K*w$: where Vbat is the motor supply voltage, K is the motor constant, and w is the rotational speed of the electric motor, a: polynomial coefficient, b: polynomial coefficient, and c: polynomial coefficient.

8. The method according to claim 7, in which:

a=0.4523, b=0.291, and c=0.07027.

9. The method according to claim 7, wherein a, b and c are integers.

10. The method according to claim 9, in which:

a=3, b=2037, and c=490979.

11. The method according to claim 10, in which parameters of the relation for determining the motor resistance are expressed in uint32, after expressing the motor resistance in mΩ, the voltage value is expressed with a gain of 100000 and the current is expressed with a gain of 100.

12. The method according to claim 11, in which a gain of 7000000 is added.

13. The method according to claim 5, in which the motor voltage is determined by multiplying the motor constant by the rotational speed of the motor.

14. A braking system adapted to implement the method according to claim 1.

15. The braking system according to claim 14, comprising a braking electric motor, and a controller adapted to implement the method.

16. The braking system according to claim 15, in which a nominal resistance of the motor is 0.34Ω and an inductance of the motor is 0.000117 H, and in which the controller has a sampling time (t) of 100 ms.

17. The braking system according to claim 16, in which the controller is a 16-bit or 32-bit controller.

18. A vehicle comprising the braking system according to claim 14.

* * * * *